US012627325B2

(12) United States Patent
Peng et al.

(10) Patent No.: US 12,627,325 B2
(45) Date of Patent: May 12, 2026

(54) RECEIVER PERFORMING ADAPTIVE CALIBRATION

(71) Applicant: National Tsing Hua University, Hsinchu City (TW)

(72) Inventors: Pen-Jui Peng, Hsinchu City (TW); Yen-Po Lin, Hsinchu City (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 363 days.

(21) Appl. No.: 18/338,028

(22) Filed: Jun. 20, 2023

(65) Prior Publication Data

US 2024/0429957 A1     Dec. 26, 2024

(51) Int. Cl.
*H04L 27/06*          (2006.01)
*H04B 1/12*          (2006.01)

(52) U.S. Cl.
CPC ............. *H04B 1/123* (2013.01); *H04L 27/06* (2013.01)

(58) Field of Classification Search
CPC ..... H04B 1/123; H04L 1/0001; H04L 1/0002; H04L 1/0003; H04L 1/0004; H04L 1/0006; H04L 1/0009; H04L 1/001; H04L 1/0014; H04L 1/0021; H04L 1/003; H04L 1/0079; H04L 47/38; H04L 69/18; H04L 27/06; H04L 65/1101; H04L 69/08; H04L 69/085; H04L 69/16; H04J 14/0223
See application file for complete search history.

(56) References Cited

U.S. PATENT DOCUMENTS

| | | | |
|---|---|---|---|
| 11,133,963 B1 | 9/2021 | Zheng et al. | |
| 11,171,815 B2 * | 11/2021 | Sun .................... | H03H 21/0012 |
| 11,271,782 B1 * | 3/2022 | Anavangot ......... | H04L 25/0272 |
| 11,398,934 B1 * | 7/2022 | Casey ................. | H04L 25/0272 |
| 2020/0195475 A1 * | 6/2020 | Lin .................... | H04L 25/03885 |
| 2022/0407676 A1 * | 12/2022 | Zhang ................... | H04L 7/0054 |

FOREIGN PATENT DOCUMENTS

TW          202201933 A     1/2022

OTHER PUBLICATIONS

Chan et al., Trending IC design directions in 2022, Journal of Semiconductor, 48 pages, 2022.*

(Continued)

*Primary Examiner* — Frank Duong
(74) *Attorney, Agent, or Firm* — Birch, Stewart, Kolasch & Birch, LLP

(57)          ABSTRACT

A receiver includes a channel compensator, a decoder and an adaptive controller. The channel compensator performs channel compensation on an input data signal to generates a feed-in data signal. The decoder demultiplexes a to-be-decoded data signal that originates from the feed-in data signal into multiple demultiplexed data signals, and decoding the demultiplexed data signals respectively into multiple decoded signals. Based on a decoded output that originates from the decoded signals, the adaptive controller performs adaptive calibration on the channel compensator to adjust a gain of the channel compensator with reference to an error portion of a first sample of the decoded signals and a data portion of a second sample of the decoded signals that is generated before the generation of the first sample of the decoded signals.

16 Claims, 2 Drawing Sheets

(56)                    References Cited

OTHER PUBLICATIONS

Peng et al., A 112-GB/s PAM-4 Voltage-Mode Transmitter With Four-Tap Two-Step FFE and Automatic Phase Alignment Techniques in 40-nm CMOS , IEEE, 9 pages, Jul. 2021.*

Yousry et al., A 1.7pJ/b 112Gb/s XSR transceiver for intra-package communication in 7nm FinFET technology, IEEE, 3 pages, 2021.*

Pen-Jui Peng et al., "A 56Gb/s PAM-4/NRZ Transceiver in 40nm CMOS," 2017 IEEE International Solid-State Circuits Conference (ISSCC), IEEE, 2017, pp. 110-112.

Taiwanese Search Report for Taiwanese Application No. 112123119, dated Feb. 27, 2024, with English translation.

* cited by examiner

RECEIVER PERFORMING ADAPTIVE CALIBRATION

FIELD

The disclosure relates to a receiver, and more particularly to a receiver performing adaptive calibration.

BACKGROUND

The Serializer/Deserializer (SerDes) function is widely used in communication standards (e.g., Ethernet, peripheral component interconnect express (PCIe), universal serial bus (USB), etc.) and extra-short reach (XSR) applications (e.g., package-to-package computing chips, optical communication chips, etc.). It is important that a receiver for converting serial input data into parallel output data can deal with channel loss, and process, voltage and temperature (PVT) variations so as to operate more stably and achieve a higher yield.

SUMMARY

Therefore, an object of the disclosure is to provide a receiver that can deal with at least one of channel loss, process variation, voltage variation or temperature variation.

According to an aspect of the disclosure, the receiver includes a channel compensator, a decoder and an adaptive controller. The channel compensator receives an input data signal, and performs channel compensation on the input data signal to generate a feed-in data signal, where a gain of the channel compensator is adjustable. The decoder is connected to the channel compensator to receive the feed-in data signal, demultiplexes a to-be-decoded data signal that originates from the feed-in data signal into a number (P) of demultiplexed data signals, and decodes the demultiplexed data signals respectively into a number (P) of decoded signals, where P≥2, each of the decoded signals contains a plurality of samples, the samples of the decoded signals are generated sequentially, each of the samples of the decoded signals contains a data portion, and each of the samples of at least one of the decoded signals further contains an error portion. The adaptive controller is connected to the decoder to receive a decoded output that originates from the decoded signals, and is further connected to the channel compensator. Based on the decoded output, the adaptive controller generates an output data signal, and performs adaptive calibration on the channel compensator to adjust the gain of the channel compensator with reference to the error portion of a first sample of the decoded signals and the data portion of a second sample of the decoded signals that is generated before the generation of the first sample of the decoded signals.

According to another aspect of the disclosure, the receiver includes a voltage regulator, a decoder and an adaptive controller. The voltage regulator generates a reference voltage, a magnitude of which is adjustable. The decoder is connected to the voltage regulator to receive the reference voltage, demultiplexes the to-be decoded data signal into a number (P) of demultiplexed data signals, and decodes the demultiplexed data signals respectively into a number (P) of decoded signals based on the reference voltage, where P≥2, each of the decoded signals contains a plurality of samples, the samples of the decoded signals are generated sequentially, each of the samples of the decoded signals contains a data portion, and each of the samples of at least one of the decoded signals further contains an error portion. The adaptive controller is connected to the decoder to receive a decoded output that originates from the decoded signals, and is further connected to the voltage regulator. Based on the decoded output, the adaptive controller generates an output data signal, and performs adaptive calibration on the voltage regulator to adjust the magnitude of the reference voltage with reference to the error portion and the data portion of a sample of the decoded signals.

According to yet another aspect of the disclosure, the receiver includes a phase interpolator, a decoder device and an adaptive controller. The phase interpolator receives a clock input, and performs phase interpolation on the clock input to generate a number (N) of interpolated clock signals, where N≥2 and a phase shift of each of the interpolated clock signals with respect to the clock input is adjustable. The decoder device includes a number (N) of decoders. Each of the decoders is connected to the phase interpolator to receive a respective one of the interpolated clock signals, and delays the respective one of the interpolated clock signals to generate a deskewed clock signal, where a delay of the deskewed clock signal with respect to the respective one of the interpolated clock signals is adjustable. The decoders cooperate with each other to receive a feed-in data signal, and to demultiplex, based on the deskewed clock signals generated by the decoders, the feed-in data signal into a number (N) of first demultiplexed data signals that are respectively provided by the decoders. Each of the decoders buffers the first demultiplexed data signal provided thereby to generate a to-be-decoded data signal, demultiplexes the to-be decoded data signal into a number (P) of second demultiplexed data signals, and decodes the second demultiplexed data signals respectively into a number (P) of decoded signals, where P≥2, each of the decoded signals contains a plurality of samples, the samples of the decoded signals are generated sequentially, each of the samples of the decoded signals contains a data portion, and each of the samples of at least one of the decoded signals further contains an error portion. The adaptive controller is connected to the decoder device to receive a decoded output that originates from the decoded signals, and is further connected to the phase interpolator. Based on the decoded output, the adaptive controller generates an output data signal, and performs adaptive calibration on the phase interpolator and the decoders to adjust the phase shifts of the interpolated clock signals and the delays of the deskewed clock signals.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
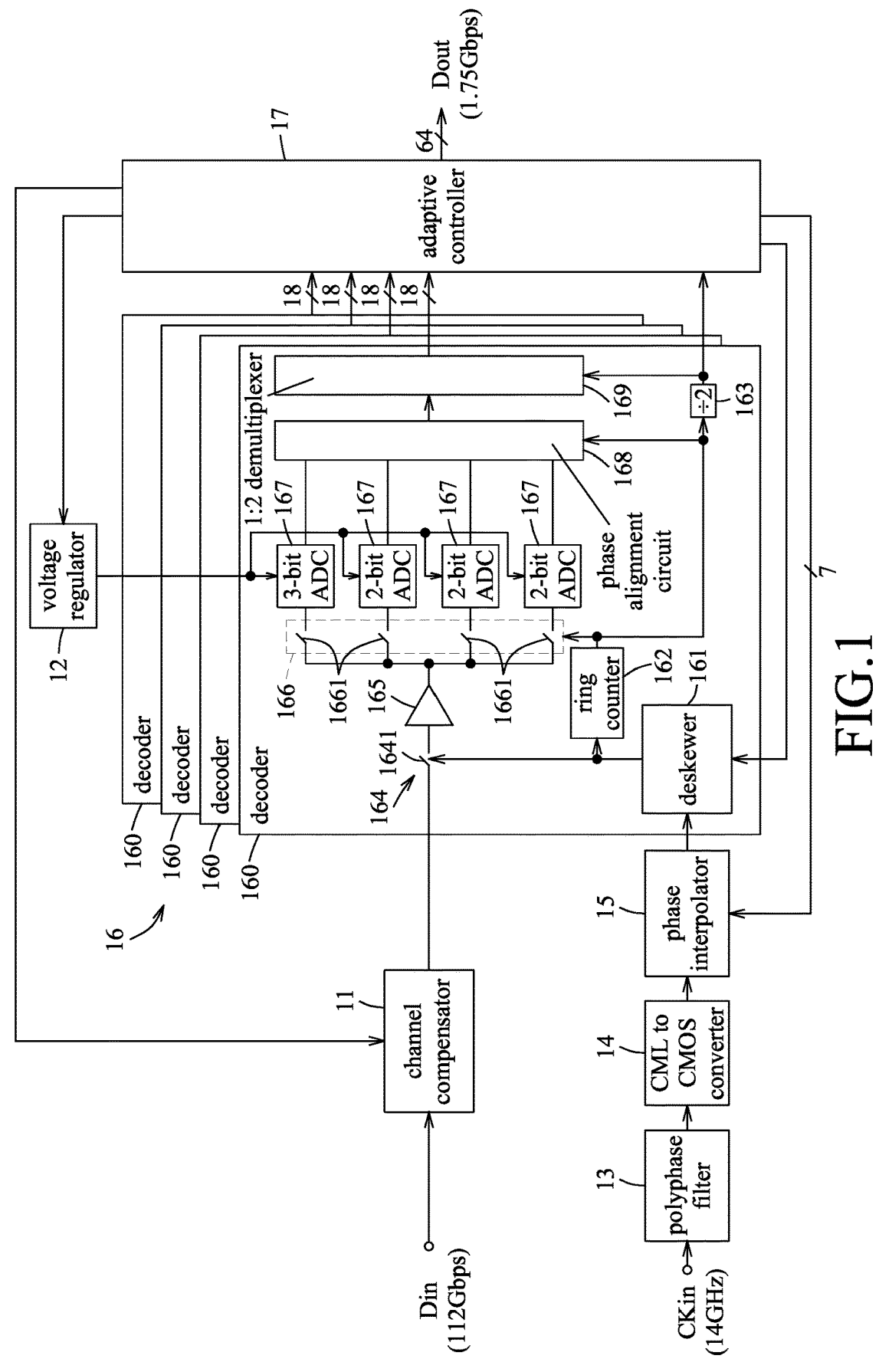
FIG. 1 is a circuit block diagram illustrating an embodiment of a receiver according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
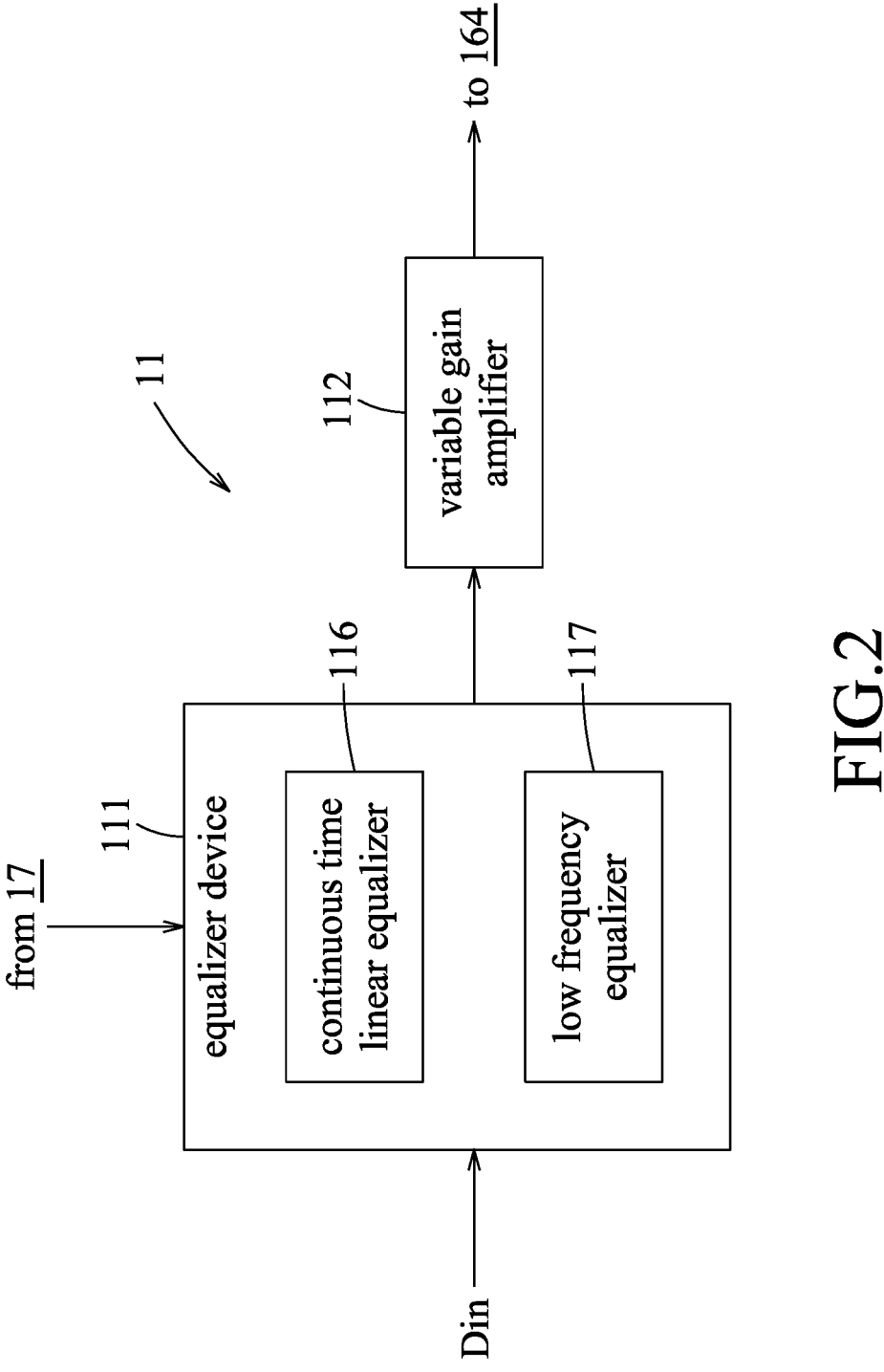
FIG. 2 is a block diagram illustrating a channel compensator of the embodiment.

Referring to FIGS. 1 and 2, an embodiment of a receiver according to the disclosure is for converting serial input data into parallel output data, and includes a channel compensator 11, a voltage regulator 12, a polyphase filter 13, a current mode logic (CML) to complementary metal oxide semiconductor (CMOS) converter 14, a phase interpolator 15, a decoder device 16 and an adaptive controller 17.

The channel compensator 11 receives an input data signal (Din) that is in a pulse amplitude modulation (PAM)-$2^M$ format, and performs channel compensation on the input data signal (Din) to generate a feed-in data signal in the PAM-$2^M$ format, where M≥2 and a gain of the channel compensator 11 is adjustable. For illustration purposes, in this embodiment, each of the input data signal (Din) and the feed-in data signal is in a PAM-4 format (i.e., M=2), and has a data rate of 112 Gbps (i.e., 56 Gbaud).

In this embodiment, the channel compensator 11 includes an equalizer device 111 and a variable gain amplifier (VGA) 112. The equalizer device 111 includes a continuous time linear equalizer (CTLE) 116 and a low frequency equalizer (LFEQ) 117. High frequency components of the input data signal (Din) are compensated by the continuous time linear equalizer 116, medium and low frequency components of the input data signal (Din) are compensated by the low frequency equalizer 117, and a resultant signal from the aforesaid compensations is adjusted by the variable gain amplifier 112 in pulse amplitude, so as to generate the feed-in data signal. Parameters of the continuous time linear equalizer 116 and the low frequency equalizer 117 can be adjusted to change the gain of the channel compensator 11.

The voltage regulator 12 generates a reference voltage having a magnitude that is adjustable.

The polyphase filter 13 receives a differential input clock signal pair (CKin) of a CML level, and splits the differential input clock signal pair (CKin) into two differential first clock signal pairs that are of the CML level and that are 90 degrees out of phase. For illustration purposes, in this embodiment, the differential input clock signal pair (CKin) has a frequency of 14 GHz.

The CML to CMOS converter 14 is connected to the polyphase filter 13 to receive the differential first clock signal pairs, and converts the differential first clock signal pairs respectively into two differential second clock signal pairs of a CMOS level.

The phase interpolator 15 cooperates with some components of the adaptive controller 17 to constitute a clock data recovery (CDR) circuit. The phase interpolator 15 is connected to the CML to CMOS converter 14 to receive the differential second clock signal pairs that cooperatively constitute a clock input, and performs phase interpolation on the clock input to generate a number (N) of interpolated clock signals, where N≥2. A phase shift of each of the interpolated clock signals with respect to the clock input is adjustable. For illustration purposes, in this embodiment, four interpolated clock signals are generated (i.e., N=4).

The decoder device 16 includes a number (N) of decoders 160 (i.e., there are four decoders 160 in this embodiment). In this embodiment, each of the decoders 160 includes a deskewer 161, a ring counter 162, a 1/Q divider 163, a first demultiplexer 164, a buffer 165, a second demultiplexer 166, a number (P) of analog to digital converters (ADCs) 167, a phase alignment circuit 168 and a 1:Q demultiplexer 169, where P≥2 and Q≥2. For illustration purposes, in this embodiment, a ½ divider 163, four ADCs 167 and a 1:2 demultiplexer 169 are used (i.e., P=4 and Q=2).

For each of the decoders 160, the deskewer 161 is connected to the phase interpolator 15 to receive a respective one of the interpolated clock signals, and delays the respective one of the interpolated clock signals to generate a deskewed clock signal. The delay of the deskewed clock signal with respect to the respective one of the interpolated clock signals is adjustable. The first demultiplexer 164 is connected to the deskewer 161 to receive the deskewed clock signal, and is further connected to the channel compensator 11.

The first demultiplexers 164 of the decoders 160 cooperate with each other to receive the feed-in data signal from the channel compensator 11, and to demultiplex, based on the deskewed clock signals generated by the deskewers 161 of the decoders 160, the feed-in data signal into a number (N) of first demultiplexed data signals (i.e., there are four first demultiplexed data signals in this embodiment) that are respectively outputted by the first demultiplexers 164. In this embodiment, each of the first demultiplexed data signals has a data rate of 14 Gbaud.

It should be noted that, for each of the deskewed clock signals, by adjusting the delay of the deskewed clock signal, a skew that is between the deskewed clock signal and any one of the other one(s) of the deskewed clock signals can be changed.

In this embodiment, for each of the decoders 160, the first demultiplexer 164 includes a sampling switch 1641. The sampling switch 1641 has a first terminal that is connected to the channel compensator 11 to receive the feed-in data signal, a second terminal that provides the corresponding one of the first demultiplexed data signals, and a control terminal that is connected to the deskewer 161 to receive the deskewed clock signal. The sampling switch 1641 switches between conduction and non-conduction based on the deskewed clock signal. When the sampling switch 1641 conducts, the feed-in data signal is transmitted through the sampling switch 1641 to serve as the corresponding one of the first demultiplexed data signals.

For each of the decoders 160, the ring counter 162 is connected to the deskewer 161 to receive the deskewed clock signal, and generates, based on the deskewed clock signal, a counting output that is P-bits wide (i.e., four-bits wide in this embodiment). A predetermined logic value (e.g., logic value "1") circulates around the bits of the counting output at the pace defined by the deskewed clock signal. The 1/Q divider 163 (i.e., the ½ divider 163 in this embodiment) is connected to the ring counter 162 to receive the counting output, and generates, based on the counting output, a third clock signal having a frequency that is 1/Q (i.e., ½ in this embodiment) of a frequency of the counting output.

For each of the decoders 160, the buffer 165 is connected to the second terminal of the sampling switch 1641 to receive the first demultiplexed data signal, and buffers the first demultiplexed data signal to generate a to-be-decoded data signal in the PAM-$2^M$ format (i.e., the PAM-4 format in this embodiment). The second demultiplexer 166 is connected to the buffer 165 to receive the to-be-decoded data signal, is further connected to the ring counter 162 to receive the counting output, and demultiplexes the to-be decoded data signal into a number (P) of second demultiplexed data signals (i.e., four second demultiplexed data signals in this embodiment) based on the counting output. Each of the ADCs 167 is connected to the second demultiplexer 166 to receive a respective one of the second demultiplexed data signals, and is further connected to the voltage regulator 12 to receive the reference voltage. One of the ADCs 167 is an (M+1)-bit ADC (i.e., a three-bit ADC in this embodiment), and performs analog to digital conversion on the respective one of the second demultiplexed data signals based on the reference voltage to generate a first decoded signal in a non-return-to-zero (NRZ) format. The first decoded signal contains a data portion that is M-bits wide (i.e., two-bits wide in this embodiment) and an error portion that is one-bit wide. Each of the other one(s) of the ADCs 167 is an M-bit ADC (i.e., a two-bit ADC in this embodiment), and performs analog to digital conversion on the respective one of the second demultiplexed data signals based on the reference voltage to generate a second decoded signal in the NRZ format. The second decoded signal contains a data portion that is M-bits wide (i.e., two-bits wide in this embodiment). In this embodiment, each of the second demultiplexed data signals has a data rate of 3.5 Gbaud.

In this embodiment, for each of the decoders 160, the second demultiplexer 166 includes a number (P) of sampling switches 1661 (i.e., there are four sampling switches 1661 in this embodiment). Each of the sampling switches 1661 has a first terminal that is connected to the buffer 165 to receive the to-be-decoded data signal, a second terminal that provides a respective one of the second demultiplexed data signals, and a control terminal that is connected to the ring counter 162 to receive a respective one of the bits of the counting output. Each of the sampling switches 1661 conducts when the respective one of the bits of the counting output is at the predetermined logic value (i.e., the logic value "1" in this embodiment), and does not conduct when otherwise. For each of the sampling switches 1661, when the sampling switch 1661 conducts, the feed-in-data signal is transmitted through the sampling switch 1661 to serve as the respective one of the second demultiplexed data signals. In addition, each of the ADCs 167 is a successive approximation ADC.

For each of the decoders 160, the phase alignment circuit 168 is connected to the ADCs 167 to receive the first and second decoded signals, is further connected to the ring counter 162 to receive the counting output, and aligns the first and second decoded signals based on the counting output to generate an aligned signal that contains a data portion and an error portion. The data portion of the aligned signal is (M×P)-bits wide (i.e., eight-bits wide in this embodiment), and originates from the data portions of the first and second decoded signals. The error portion of the aligned signal is one-bit wide, and originates from the error portion of the first decoded signal. The 1:Q demultiplexer 169 (i.e., the 1:2 demultiplexer 169 in this embodiment) is connected to the phase alignment circuit 168 to receive the aligned signal, is further connected to the 1/Q divider 163 (i.e., the ½ divider 163 in this embodiment) to receive the third clock signal, and demultiplexes, based on the third clock signal, the aligned signal into a demultiplexed signal that contains a data portion and an error portion. The data portion of the demultiplexed signal is (M×P×Q)-bits wide (i.e., sixteen-bits wide in this embodiment), and originates from the data portions of the first and second decoded signals. The error portion of the demultiplexed signal is Q-bits wide (i.e., two-bits wide in this embodiment), and originates from the error portion of the first decoded signal. The demultiplexed signals generated by the 1:Q demultiplexers 169 (i.e., the 1:2 demultiplexers 169 in this embodiment) of the decoders 160 cooperatively constitute a decoded output. In this embodiment, for each of the decoders 160, the aligned signal has a data rate of 8×3.5 Gbps for the data portion thereof and a data rate of 1×3.5 Gbps for the error portion thereof, and the demultiplexed signal has a data rate of 16×1.75 Gbps for the data portion thereof and a data rate of 2×1.75 Gbps for the error portion thereof.

The adaptive controller 17 is connected to the 1:Q demultiplexers 169 (i.e., the 1:2 demultiplexers 169 in this embodiment) of the decoders 160 to receive the decoded output, is further connected to the equalizer device 111, the voltage regulator 12, the phase interpolator 15 and the deskewers 161 of the decoders 160, and generates an output data signal (Dout) based on a data portion of the decoded output that originates from the data portions of the first and second decoded signals generated by the ADCs 167 of the decoders 160. The adaptive controller 17 further performs adaptive calibration on the equalizer device 111, the voltage regulator 12, the phase interpolator 13 and the deskewers 161 of the decoders 160 to adjust the gain of the channel compensator 11, the magnitude of the reference voltage, the phase shifts of the interpolated clock signals and the delays of the deskewed clock signals based on an error portion of the decoded output that originates from the error portions of the first decoded signals and on the data portion of the decoded output, so as to obtain an optimal quality of the feed-in data signal's eye diagram, a correct swing of the feed-in data signal, and optimal sample positions of the feed-in data signal. In this embodiment, the output data signal (Dout) has a data rate of 64×1.75 Gbps.

In this embodiment, each of the first and second decoded signals contains a plurality of samples that are sequentially arranged in time. The ADCs 167 of the decoders 160 operate one by one cyclically at a pace defined by a time interval corresponding to a frequency that is a number (N) of times (i.e., four times in this embodiment) a frequency of each of the interpolated clock signals, so as to generate the samples of the first and second decoded signals. Table 1 shows an exemplary sequence of the generation of the samples of the first and second decoded signals in each operation cycle, where D[.] denotes the data portion of a sample of the first and second decoded signals which is at one of a logic value "00" (corresponding to a value of −3), a logic value "01" (corresponding to a value of −1), a logic value "10" (corresponding to a value of +1) and a logic value "11" (corresponding to a value of +3), and E[.] denotes the error portion of a sample of the first decoded signals which is at one of a logic value "0" and a logic value "1".

TABLE 1

|  | 3-bit ADC | 2-bit ADC (I) | 2-bit ADC (II) | 2-bit ADC (III) |
|---|---|---|---|---|
| Decoder (I) | D[16 × r + 0] | D[16 × r + 4] | D[16 × r + 8] | D[16 × r + 12] |
|  | E[16 × r + 0] | — | — | — |
| Decoder (II) | D[16 × r + 1] | D[16 × r + 5] | D[16 × r + 9] | D[16 × r + 13] |
|  | E[16 × r + 1] | — | — | — |
| Decoder (III) | D[16 × r + 2] | D[16 × r + 6] | D[16 × r + 10] | D[16 × r + 14] |
|  | E[16 × r + 2] | — | — | — |
| Decoder (IV) | D[16 × r + 3] | D[16 × r + 7] | D[16 × r + 11] | D[16 × r + 15] |
|  | E[16 × r + 3] | — | — | — | r: a non-negative integer

In this embodiment, as shown in Table 2, the adaptive controller 17 performs adaptive calibration on the equalizer device 111 to adjust the gain of the channel compensator 11 with reference to the error portion of a sample of the first decoded signals (E[a]) and the data portion of a sample of the first and second decoded signals (D[a–K]) that is generated before the generation of the sample of the first decoded signals. In an example, the sample of the first and second decoded signals is generated before the generation of the sample of the first decoded signals by a number (K) of the time intervals, where 1≤K≤3.

TABLE 2

| D[a – K] | E[a] | Gain |
|---|---|---|
| 1x | 1 | Increase |
| 0x | 0 | Increase |
| 1x | 0 | Decrease |
| 0x | 1 | Decrease | x: don't care

The adaptive controller 17 increases the gain of the channel compensator 11 when any one of the following conditions is met: (a) the data portion of the sample of the first and second decoded signals (D[a–K]) is represented by a positive value (i.e., being at the logic value "10" which corresponds to the value of +1 or at the logic value "11" which corresponds the value of +3), and the error portion of the sample of the first decoded signals (E[a]) is at the logic value "1"; and (b) the data portion of the sample of the first and second decoded signals (D[a–K]) is represented by a negative value (i.e., being at the logic value "00" which corresponds to the value of –3 or at the logic value "01" which corresponds to the value of –1), and the error portion of the sample of the first decoded signals (E[a]) is at the logic value "0".

The adaptive controller 17 decreases the gain of the channel compensator 11 when any one of the following conditions is met: (a) the data portion of the sample of the first and second decoded signals (D[a–K]) is represented by a positive value, and the error portion of the sample of the first decoded signals (E[a]) is at the logic value "0"; and (b) the data portion of the sample of the first and second decoded signals (D[a–K]) is represented by a negative value, and the error portion of the sample of the first decoded signals (E[a]) is at the logic value "1".

Otherwise, the adaptive controller 17 keeps the gain of the channel compensator 11 unchanged.

In this embodiment, as shown in Table 3, the adaptive controller 17 performs adaptive calibration on the voltage regulator 12 to adjust the magnitude of the reference voltage with reference to the error portion and the data portion of a sample of the first decoded signals (E[a], D[a]).

TABLE 3

| D[a] | E[a] | Magnitude |
|---|---|---|
| 1x | 1 | Increase |
| 0x | 0 | Increase |
| 1x | 0 | Decrease |
| 0x | 1 | Decrease | x: inconsequential

The adaptive controller 17 increases the magnitude of the reference voltage when any one of the following conditions is met: (a) the data portion of the sample of the first decoded signals (D[a]) is represented by a positive value, and the error portion of the sample of the first decoded signals (E[a]) is at the logic value "1"; and (b) the data portion of the sample of the first decoded signals (D[a]) is represented by a negative value, and the error portion of the sample of the first decoded signals (E[a]) is at the logic value "0".

The adaptive controller 17 decreases the magnitude of the reference voltage when any one of the following conditions is met: (a) the data portion of the sample of the first decoded signals (D[a]) is represented by a positive value, and the error portion of the sample of the first decoded signals (E[a]) is at the logic value "0"; and (b) the data portion of the sample of the first decoded signals (D[a]) is represented by a negative value, and the error portion of the sample of the first decoded signals (E[a]) is at the logic value "1".

Otherwise, the adaptive controller 17 keeps the magnitude of the reference voltage unchanged.

In this embodiment, as shown in Table 4, the adaptive controller 17 performs adaptive calibration on the phase interpolator 15 to adjust the phase shifts of the interpolated clock signals with reference to the error portion and the data portion of a sample of the first decoded signals (E[a], D[a]) and the error portion and the data portion of another sample of the first decoded signals (E[a+1], D[a+1]) that is generated after the generation of the sample of the first decoded signals by the time interval.

TABLE 4

| D[a] | D[a + 1] | E[a] | E[a + 1] | Phase |
|---|---|---|---|---|
| 11 | 00 | 1 | 1 | Defer |
| 11 | 00 | 0 | 0 | Advance |
| 10 | 01 | 1 | 1 | Defer |
| 10 | 01 | 0 | 0 | Advance |
| 01 | 10 | 1 | 1 | Advance |
| 01 | 10 | 0 | 0 | Defer |
| 00 | 11 | 1 | 1 | Advance |
| 00 | 11 | 0 | 0 | Defer |

The adaptive controller 17 adjusts the phase shifts of the interpolated clock signals to defer phases of the interpolated clock signals when any one of the following conditions is met: (a) the data portion of the sample of the first decoded signals (D[a]) is represented by a value of +L, the data portion of the another sample of the first decoded signals (D[a+1]) is represented by a value of –L, the error portion of the sample of the first decoded signals (E[a]) is at the logic value "1", and the error portion of the another sample of the first decoded signals (E[a+1]) is at the logic value "1"; and (b) the data portion of the sample of the first decoded signals (D[a]) is represented by a value of –L, the data portion of the another sample of the first decoded signals (D[a+1]) is represented by a value of +L, the error portion of the sample of the first decoded signals (E[a]) is at the logic value "0", and the error portion of the another sample of the first decoded signals (E[a+1]) is at the logic value "0", where L is a positive odd integer smaller than $2^M$ (i.e., L is one or three in this embodiment).

The adaptive controller 17 adjusts the phase shifts of the interpolated clock signals to advance phases of the interpolated clock signals when any one of the following conditions is met: (a) the data portion of the sample of the first decoded signals (D[a]) is represented by a value of +L, the data portion of the another sample of the first decoded signals (D[a+1]) is represented by a value of –L, the error portion of the sample of the first decoded signals (E[a]) is at the logic value "0", and the error portion of the another sample of the first decoded signals (E[a+1]) is at the logic value "0"; and (b) the data portion of the sample of the first decoded signals (D[a]) is represented by a value of –L, the data portion of the another sample of the first decoded signals (D[a+1]) is represented by a value of +L, the error portion of the sample of the first decoded signals (E[a]) is at the logic value "1", and the error portion of the another sample of the first decoded signals (E[a+1]) is at the logic value "1".

Otherwise, the adaptive controller 17 keeps the phase shifts of the interpolated clock signals unchanged.

In this embodiment, as shown in Table 5, the adaptive controller 17 performs adaptive calibration on the deskewers 161 of the decoders 160 to adjust the delays of the deskewed clock signals with reference to the error portion and the data portion of a sample of the first decoded signals (E[a], D[a]), the error portion and the data portion of another sample of the first decoded signals (E[a+1], D[a+1]) that is generated after the generation of the sample of the first decoded signals by the time interval, the data portion of a sample of the first and second decoded signals (D[a–1]) that is generated before the generation of the sample of the first decoded signals by the time interval, and the data portion of another sample of the first and second decoded signals (D[a+2]) that is generated after the generation of the another sample of the first decoded signals by the time interval.

TABLE 5

| D[a – 1] | D[a] | D[a + 1] | D[a + 2] | E[a] | E[a + 1] | Skew |
|----------|------|----------|----------|------|----------|------|
| 11 | 11 | 00 | 00 | 1 | 0 | Decrease |
| 11 | 11 | 00 | 00 | 0 | 1 | Increase |
| 10 | 10 | 01 | 01 | 1 | 0 | Decrease |
| 10 | 10 | 01 | 01 | 0 | 1 | Increase |
| 01 | 01 | 10 | 10 | 1 | 0 | Increase |
| 01 | 01 | 10 | 10 | 0 | 1 | Decrease |
| 00 | 00 | 11 | 11 | 1 | 0 | Increase |
| 00 | 00 | 11 | 11 | 0 | 1 | Decrease |
| 00 | 11 | 11 | 00 | 1 | 1 | Increase |
| 00 | 11 | 11 | 00 | 0 | 0 | Decrease |
| 01 | 10 | 10 | 01 | 1 | 1 | Increase |
| 01 | 10 | 10 | 01 | 0 | 0 | Decrease |
| 10 | 01 | 01 | 10 | 1 | 1 | Decrease |
| 10 | 01 | 01 | 10 | 0 | 0 | Increase |
| 11 | 00 | 00 | 11 | 1 | 1 | Decrease |
| 11 | 00 | 00 | 11 | 0 | 0 | Increase |

The adaptive controller 17 adjusts the delays of the deskewed clock signals to decrease the skew between two of the deskewed clock signals respectively generated by two of the decoders 160 respectively generating the sample and the another sample of the first decoded signals when any one of the following conditions is met: (a) the data portion of the sample of the first and second decoded signals (D[a–1]) is represented by a value of +L, the data portion of the sample of the first decoded signals (D[a]) is represented by a value of +L, the data portion of the another sample of the first decoded signals (D[a+1]) is represented by a value of –L, the data portion of the another sample of the first and second decoded signals (D[a+2]) is represented by a value of –L, the error portion of the sample of the first decoded signals (E[a]) is at the logic value "1", and the error portion of the another sample of the first decoded signals (E[a+1]) is at the logic value "0"; (b) the data portion of the sample of the first and second decoded signals (D[a–1]) is represented by a value of –L, the data portion of the sample of the first decoded signals (D[a]) is represented by a value of –L, the data portion of the another sample of the first decoded signals (D[a+1]) is represented by a value of +L, the data portion of the another sample of the first and second decoded signals (D[a+2]) is represented by a value of +L, the error portion of the sample of the first decoded signals (E[a]) is at the logic value "0", and the error portion of the another sample of the first decoded signals (E[a+1]) is at the logic value "1"; (c) the data portion of the sample of the first and second decoded signals (D[a–1]) is represented by a value of –L, the data portion of the sample of the first decoded signals (D[a]) is represented by a value of +L, the data portion of the another sample of the first decoded signals (D[a+1]) is represented by a value of +L, the data portion of the another sample of the first and second decoded signals (D[a+2]) is represented by a value of –L, the error portion of the sample of the first decoded signals (E[a]) is at the logic value "0", and the error portion of the another sample of the first decoded signals (E[a+1]) is at the logic value "0"; and (d) the data portion of the sample of the first and second decoded signals (D[a–1]) is represented by a value of +L, the data portion of the sample of the first decoded signals (D[a]) is represented by a value of –L, the data portion of the another sample of the first decoded signals (D[a+1]) is represented by a value of –L, the data portion of the another sample of the first and second decoded signals (D[a+2]) is represented by a value of +L, the error portion of the sample of the first decoded signals (E[a]) is at the logic value "1", and the error portion of the another sample of the first decoded signals (E[a+1]) is at the logic value "1", where L is a positive odd integer smaller than $2^M$ (i.e., L is one or three in this embodiment).

The adaptive controller 17 adjusts the delays of the deskewed clock signals to increase the skew when any one of the following conditions is met: (a) the data portion of the sample of the first and second decoded signals (D[a–1]) is represented by a value of +L, the data portion of the sample of the first decoded signals (D[a]) is represented by a value of +L, the data portion of the another sample of the first decoded signals (D[a+1]) is represented by a value of –L, the data portion of the another sample of the first and second decoded signals (D[a+2]) is represented by a value of –L, the error portion of the sample of the first decoded signals (E[a]) is at the logic value "0", and the error portion of the another sample of the first decoded signals (E[a+1]) is at the logic value "1"; (b) the data portion of the sample of the first and second decoded signals (D[a–1]) is represented by a value of –L, the data portion of the sample of the first decoded signals (D[a]) is represented by a value of –L, the data portion of the another sample of the first decoded signals (D[a+1]) is represented by a value of +L, the data portion of the another sample of the first and second decoded signals (D[a+2]) is represented by a value of +L, the error portion of the sample of the first decoded signals (E[a]) is at the logic value "1", and the error portion of the another sample of the first decoded signals (E[a+1]) is at the logic value "0"; (c) the data portion of the sample of the first and second decoded signals (D[a–1]) is represented by a value of –L, the data portion of the sample of the first decoded signals (D[a]) is represented by a value of +L, the data portion of the another sample of the first decoded signals (D[a+1]) is represented by a value of +L, the data portion of the another sample of the first and second decoded signals (D[a+2]) is represented by a value of –L, the error portion of the sample of the first decoded signals (E[a]) is at the logic value "1", and the error portion of the another sample of the first decoded signals (E[a+1]) is at the logic value "1"; and (d) the data portion of the sample of the first and second decoded signals (D[a–1]) is represented by a value of +L, the data portion of the sample of the first decoded signals (D[a]) is represented by a value of –L, the data portion of the another sample of the first decoded signals (D[a+1]) is represented by a value of –L, the data portion of the another sample of the first and second decoded signals (D[a+2]) is represented by a value of +L, the error portion of the sample of the first decoded signals (E[a]) is at the logic value "0", and the error portion of the another sample of the first decoded signals (E[a+1]) is at the logic value "0".

Otherwise, the adaptive controller 17 keeps the delays of the deskewed clock signals unchanged.

In view of the above, the receiver of this embodiment has the following advantages.

1. The continuous time linear equalizer 116 is only used to compensate the high frequency components of the input data signal (Din), so the receiver is suitable for operating under a circumstance where the input data signal (Din) is transmitted through a low loss channel. In addition, the ADCs 167 of the decoders 160 are each a successive approximation ADC, and operate in a time interleaved manner because of the first and second demultiplexers 164, 166 of the decoders 160. These above factors are beneficial for reducing power consumption of the decoder device 16.

2. For each of the decoders 160, only one of the ADCs 167 is an (M+1)-bit ADC (i.e., a three-bit ADC in this embodiment) that extracts error terms respectively corresponding to a number ($2^M$) of data values (i.e., four data values in this embodiment) of the data portion of the first decoded signal for use in adaptive calibration performed on the equalizer device 111 and the phase interpolator 15. This can help attain acceptable jitter tolerance for the clock data recovery circuit, enhance performance of the receiver, and reduce power consumption of the receiver.

3. The voltage regulator 12 generates a reference voltage for use by all of the ADCs 167 of the decoders 160, which is beneficial for reducing the size and power consumption of the voltage regulator 12.

4. By virtue of the buffer 165 connected between the first demultiplexer 164 and the second demultiplexer 166 in each of the decoders 160, the channel compensator 11 has a light load capacitance at its output terminal and thus a wide bandwidth.

5. By virtue of the adaptive controller 17 performing the adaptive calibration on the equalizer device 111, the voltage regulator 12, the phase interpolator 15 and the deskewers 161 of the decoders 160, the receiver can deal with channel loss, and process, voltage and temperature (PVT) variations, thereby operating more stably and achieving a higher yield.

6. Only the sign (positive or negative) of the data portion of the sample of the first and second decoded signals (D[a−K]) are considered in the adaptive calibration performed on the equalizer device 111, which can increase effective valid pattern density.

7. The data portion of the sample of the first and second decoded signals (D[a−1]) and the data portion of the another sample of the first and second decoded signals (D[a+2]) are considered in the adaptive calibration performed on the deskewers 161 of the decoders 160, which can eliminate effect of inter-symbol interference (ISI) to enhance accuracy of the adaptive calibration.

8. More transition patterns are considered in the adaptive calibration performed on the phase interpolator 15, which can increase a loop bandwidth of the clock data recovery circuit and reduce a clock jitter of the clock data recovery circuit.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A receiver comprising:

a channel compensator receiving an input data signal, and performing channel compensation on the input data signal to generate a feed-in data signal, where a gain of said channel compensator is adjustable;

a decoder connected to said channel compensator to receive the feed-in data signal, demultiplexing a to-be-decoded data signal that originates from the feed-in data signal into a number (P) of demultiplexed data signals, and decoding the demultiplexed data signals respectively into a number (P) of decoded signals, where P≥2, each of the decoded signals contains a plurality of samples, the samples of the decoded signals are generated sequentially, each of the samples of the decoded signals contains a data portion, and each of the samples of at least one of the decoded signals further contains an error portion; and an adaptive controller connected to said decoder to receive a decoded output that originates from the decoded signals, and further connected to said channel compensator;

based on the decoded output, said adaptive controller generating an output data signal, and performing adaptive calibration on said channel compensator to adjust the gain of said channel compensator, wherein the adaptive calibration is performed with reference to the error portion of a first sample of the decoded signals and the data portion of a second sample of the decoded signals that is generated before the generation of the first sample of the decoded signals.

2. The receiver as claimed in claim 1, wherein:

the input data signal is in a pulse amplitude modulation (PAM)-$2^M$ format, where M≥2;

the decoded signals includes a first decoded signal and a number (P−1) of second decoded signals; and said decoder includes a demultiplexer receiving the to-be-decoded data signal, and demultiplexing the to-be decoded data signal into the demultiplexed data signals, and a number (P) of analog to digital converters (ADCs), each of which is connected to said demultiplexer to receive a respective one of the demultiplexed data signals, one of said ADCs being an (M+1)-bit ADC, and performing analog to digital conversion on the respective one of the demultiplexed data signals to generate the first decoded signal containing a data portion that is M-bits wide and an error portion that is one-bit wide, each of the other one(s) of said ADCs being an M-bit ADC, and performing analog to digital conversion on the respective one of the demultiplexed data signals to generate a respective one of the second decoded signal containing a data portion that is M-bits wide.

3. The receiver as claimed in claim 1, wherein:

the samples of the decoded signals are generated sequentially at a pace defined by a time interval; and the second sample of the decoded signals is generated before the generation of the first sample of the decoded signals by a number (K) of the time intervals, where $1 \leq K \leq 3$.

4. The receiver as claimed in claim 1, wherein said adaptive controller increases the gain of said channel compensator when any one of the following conditions is met:

the data portion of the second sample of the decoded signals is represented by a positive value, and the error portion of the first sample of the decoded signals is at a logic value "1"; and the data portion of the second sample of the decoded signals is represented by a negative value, and the error portion of the first sample of the decoded signals is at a logic value "0".

5. The receiver as claimed in claim 1, wherein said adaptive controller decreases the gain of said channel compensator when any one of the following conditions is met:

the data portion of the second sample of the decoded signals is represented by a positive value, and the error portion of the first sample of the decoded signals is at a logic value "0"; and the data portion of the second sample of the decoded signals is represented by a negative value, and the error portion of the first sample of the decoded signals is at a logic value "1".

6. A receiver comprising:

a voltage regulator generating a reference voltage, a magnitude of which is adjustable;

a decoder connected to said voltage regulator to receive the reference voltage, demultiplexing a to-be decoded data signal into a number (P) of demultiplexed data signals, and decoding the demultiplexed data signals respectively into a number (P) of decoded signals based on the reference voltage, where $P \geq 2$, each of the decoded signals contains a plurality of samples, the samples of the decoded signals are generated sequentially, each of the samples of the decoded signals contains a data portion, and each of the samples of at least one of the decoded signals further contains an error portion; and an adaptive controller connected to said decoder to receive a decoded output that originates from the decoded signals, and further connected to said voltage regulator;

based on the decoded output, said adaptive controller generating an output data signal, and performing adaptive calibration on said voltage regulator to adjust the magnitude of the reference voltage, wherein the adaptive calibration is performed with reference to the error portion and the data portion of a sample of the decoded signals.

7. The receiver as claimed in claim 6, wherein:

the to-be-decoded data signal is in a pulse amplitude modulation (PAM)-$2^M$ format, where $M \geq 2$;

the decoded signals includes a first decoded signal and a number (P−1) of second decoded signals; and said decoder includes a demultiplexer receiving the to-be-decoded data signal, and demultiplexing the to-be decoded data signal into the demultiplexed data signals, and a number (P) of analog to digital converters (ADCs), each of which is connected to said demultiplexer to receive a respective one of the demultiplexed data signals, and is further connected to said voltage regulator to receive the reference voltage, one of said ADCs being an (M+1)-bit ADC, and performing analog to digital conversion on the respective one of the demultiplexed data signals based on the reference voltage to generate the first decoded signal containing a data portion that is M-bits wide and an error portion that is one-bit wide, each of the other one(s) of said ADCs being an M-bit ADC, and performing analog to digital conversion on the respective one of the demultiplexed data signals based on the reference voltage to generate a respective one of the second decoded signals containing a data portion that is M-bits wide.

8. The receiver as claimed in claim 6, wherein said adaptive controller increases the magnitude of the reference voltage when any one of the following conditions is met:

the data portion of the sample of the decoded signals is represented by a positive value, and the error portion of the sample of the decoded signals is at a logic value "1"; and the data portion of the sample of the decoded signals is represented by a negative value, and the error portion of the sample of the decoded signals is at a logic value "0".

9. The receiver as claimed in claim 6, wherein said adaptive controller decreases the magnitude of the reference voltage when any one of the following conditions is met:

the data portion of the sample of the decoded signals is represented by a positive value, and the error portion of the sample of the decoded signals is at a logic value "0"; and the data portion of the sample of the decoded signals is represented by a negative value, and the error portion of the sample of the decoded signals is at a logic value "1".

10. A receiver comprising:

a phase interpolator receiving a clock input, and performing phase interpolation on the clock input to generate a number (N) of interpolated clock signals, where $N \geq 2$ and a phase shift of each of the interpolated clock signals with respect to the clock input is adjustable;

a decoder device including a number (N) of decoders;

each of said decoders being connected to said phase interpolator to receive a respective one of the interpolated clock signals, and delaying the respective one of the interpolated clock signals to generate a deskewed clock signal, where a delay of the deskewed clock signal with respect to the respective one of the interpolated clock signals is adjustable;

said decoders cooperating with each other to receive a feed-in data signal, and to demultiplex, based on the deskewed clock signals generated by said decoders, the feed-in data signal into a number (N) of first demultiplexed data signals that are respectively provided by said decoders;

each of said decoders buffering the first demultiplexed data signal provided thereby to generate a to-be-decoded data signal, demultiplexing the to-be decoded data signal into a number (P) of second demultiplexed data signals, and decoding the second demultiplexed data signals respectively into a number (P) of decoded signals, where P≥2, each of the decoded signals contains a plurality of samples, the samples of the decoded signals are generated sequentially, each of the samples of the decoded signals contains a data portion, and each of the samples of at least one of the decoded signals further contains an error portion; and an adaptive controller connected to said decoder device to receive a decoded output that originates from the decoded signals generated by said decoders, and further connected to said phase interpolator;

based on the decoded output, said adaptive controller generating an output data signal, and performing adaptive calibration on said phase interpolator and said decoders to adjust the phase shifts of the interpolated clock signals and the delays of the deskewed clock signals;

wherein the samples of the decoded signals are generated sequentially at a pace defined by a time interval; and wherein said adaptive controller performs adaptive calibration on said phase interpolator to adjust the phase shifts of the interpolated clock signals with reference to the error portion and the data portion of a first sample of the decoded signals and the error portion and the data portion of a second sample of the decoded signals that is generated after the generation of the first sample of the decoded signals by the time interval.

11. The receiver as claimed in claim 10, wherein:

the feed-in data signal is in a pulse amplitude modulation (PAM)-$2^M$ format, where M≥2;

the decoded signals includes a first decoded signal and a number (P−1) of second decoded signals;

each of said decoders includes a deskewer, a first demultiplexer, a buffer, a second demultiplexer and a number (P) of analog to digital converters (ADCs);

for each of said decoders, said deskewer is connected to said phase interpolator to receive the respective one of the interpolated clock signals, and delaying the respective one of the interpolated clock signals to generate the deskewed clock signal, and said first demultiplexer is connected to said deskewer to receive the deskewed clock signal;

said first demultiplexers of said decoders cooperates with each other to receive the feed-in data signal, and to demultiplex, based on the deskewed clock signals generated by said deskewers of said decoders, the feed-in data signal into the first demultiplexed data signals that are respectively outputted by said first demultiplexers; and for each of said decoders, said buffer is connected to said first demultiplexer to receive the first demultiplexed data signal outputted by said first demultiplexer, and buffers the first demultiplexed data signal to generate the to-be-decoded data signal, said second demultiplexer is connected to said buffer to receive the to-be-decoded data signal, and demultiplexes the to-be decoded data signal into the second demultiplexed data signals, each of said ADCs is connected to said second demultiplexer to receive a respective one of the second demultiplexed data signals, one of said ADCs is an (M+1)-bit ADC, and performs analog to digital conversion on the respective one of the second demultiplexed data signals to generate the first decoded signal containing a data portion that is M-bits wide and an error portion that is one-bit wide, and each of the other one(s) of said ADCs is an M-bit ADC, and performs analog to digital conversion on the respective one of the second demultiplexed data signals to generate a respective one of the second decoded signals containing a data portion that is M-bits wide.

12. The receiver as claimed in claim 10, wherein the feed-in data signal is in a PAM-$2^M$ format, where M≥2, and said adaptive controller adjusts the phase shifts of the interpolated clock signals to defer phases of the interpolated clock signals when any one of the following conditions is met:

the data portion of the first sample of the decoded signals is represented by a value of +L, the data portion of the second sample of the decoded signals is represented by a value of −L, the error portion of the first sample of the decoded signals is at a logic value "1", and the error portion of the second sample of the decoded signals is at the logic value "1", where L is a positive odd integer smaller than $2^M$; and the data portion of the first sample of the decoded signals is represented by a value of −L, the data portion of the second sample of the decoded signals is represented by a value of +L, the error portion of the first sample of the decoded signals is at a logic value "0", and the error portion of the second sample of the decoded signals is at the logic value "0".

13. The receiver as claimed in claim 10, wherein the feed-in data signal is in a PAM-$2^M$ format, where M≥2, and said adaptive controller adjusts the phase shifts of the interpolated clock signals to advance phases of the interpolated clock signals when any one of the following conditions is met:

the data portion of the first sample of the decoded signals is represented by a value of +L, the data portion of the second sample of the decoded signals is represented by a value of −L, the error portion of the first sample of the decoded signals is at a logic value "0", and the error portion of the second sample of the decoded signals is at the logic value "0", where L is a positive odd integer smaller than $2^M$; and the data portion of the first sample of the decoded signals is represented by a value of −L, the data portion of the second sample of the decoded signals is represented by a value of +L, the error portion of the first sample of the decoded signals is at a logic value "1", and the error portion of the second sample of the decoded signals is at the logic value "1".

14. The receiver as claimed in claim 10, wherein:

said adaptive controller performs adaptive calibration on said decoders to adjust the delays of the deskewed clock signals with reference to the error portion and the data portion of a first sample of the decoded signals, the error portion and the data portion of a second sample of the decoded signals that is generated after the generation of the first sample of the decoded signals by the time interval, the data portion of a third sample of the decoded signals that is generated before the generation of the first sample of the decoded signals by the time interval, and the data portion of a fourth sample of the decoded signals that is generated after the generation of the second sample of the decoded signals by the time interval.

15. The receiver as claimed in claim 14, wherein the feed-in data signal is in a PAM-$2^M$ format, where M≥2, and said adaptive controller adjusts the delays of the deskewed clock signals to decrease a skew between two of the deskewed clock signals respectively generated by two of said decoders respectively generating the first sample and the second sample of the decoded signals when any one of the following conditions is met:

the data portion of the third sample of the decoded signals is represented by a value of +L, the data portion of the first sample of the decoded signals is represented by a value of +L, the data portion of the second sample of the decoded signals is represented by a value of −L, the data portion of the fourth sample of the decoded signals is represented by a value of −L, the error portion of the first sample of the decoded signals is at a logic value "1", and the error portion of the second sample of the decoded signals is at a logic value "0", where L is a positive odd integer smaller than $2^M$;

the data portion of the third sample of the decoded signals is represented by a value of −L, the data portion of the first sample of the decoded signals is represented by a value of −L, the data portion of the second sample of the decoded signals is represented by a value of +L, the data portion of the fourth sample of the decoded signals is represented by a value of +L, the error portion of the first sample of the decoded signals is at the logic value "0", and the error portion of the second sample of the decoded signals is at the logic value "1";

the data portion of the third sample of the decoded signals is represented by a value of −L, the data portion of the first sample of the decoded signals is represented by a value of +L, the data portion of the second sample of the decoded signals is represented by a value of +L, the data portion of the fourth sample of the decoded signals is represented by a value of −L, the error portion of the first sample of the decoded signals is at the logic value "0", and the error portion of the second sample of the decoded signals is at the logic value "0"; and the data portion of the third sample of the decoded signals is represented by a value of +L, the data portion of the first sample of the decoded signals is represented by a value of −L, the data portion of the second sample of the decoded signals is represented by a value of −L, the data portion of the fourth sample of the decoded signals is represented by a value of +L, the error portion of the first sample of the decoded signals is at the logic value "1", and the error portion of the second sample of the decoded signals is at the logic value "1".

16. The receiver as claimed in claim 14, wherein the feed-in data signal is in a PAM-$2^M$ format, where M≥2, and said adaptive controller adjusts the delays of the deskewed clock signals to increase a skew between two of the deskewed clock signals respectively generated by two of said decoders respectively generating the first sample and the second sample of the decoded signals when any one of the following conditions is met:

the data portion of the third sample of the decoded signals is represented by a value of +L, the data portion of the first sample of the decoded signals is represented by a value of +L, the data portion of the second sample of the decoded signals is represented by a value of −L, the data portion of the fourth sample of the decoded signals is represented by a value of −L, the error portion of the first sample of the decoded signals is at a logic value "0", and the error portion of the second sample of the decoded signals is at a logic value "1", where L is a positive odd integer smaller than $2^M$;

the data portion of the third sample of the decoded signals is represented by a value of −L, the data portion of the first sample of the decoded signals is represented by a value of −L, the data portion of the second sample of the decoded signals is represented by a value of +L, the data portion of the fourth sample of the decoded signals is represented by a value of +L, the error portion of the first sample of the decoded signals is at the logic value "1", and the error portion of the second sample of the decoded signals is at the logic value "0";

the data portion of the third sample of the decoded signals is represented by a value of −L, the data portion of the first sample of the decoded signals is represented by a value of +L, the data portion of the second sample of the decoded signals is represented by a value of +L, the data portion of the fourth sample of the decoded signals is represented by a value of −L, the error portion of the first sample of the decoded signals is at the logic value "1", and the error portion of the second sample of the decoded signals is at the logic value "1"; and the data portion of the third sample of the decoded signals is represented by a value of +L, the data portion of the first sample of the decoded signals is represented by a value of −L, the data portion of the second sample of the decoded signals is represented by a value of −L, the data portion of the fourth sample of the decoded signals is represented by a value of +L, the error portion of the first sample of the decoded signals is at the logic value "0", and the error portion of the second sample of the decoded signals is at the logic value "0".

* * * * *